United States Patent
Burns et al.

(10) Patent No.: US 9,615,651 B2
(45) Date of Patent: Apr. 11, 2017

(54) UNIVERSAL HOLDER AND MOBILE PLATFORM FOR SUPPORTING A PLURALITY OF HAND-HELD DEVICES

(71) Applicant: HAND E HOLDER PRODUCTS, INC., Ann Arbor, MI (US)

(72) Inventors: Michael Lawrence Burns, Ann Arbor, MI (US); Daniel Patrick Burns, Fenton, MI (US); John Mark Wilson, Trenton, MI (US)

(73) Assignee: Hand E Holder Products, Inc., Ann Arbor, MI (US)

( * ) Notice: Subject to any disclaimer, the term of this patent is extended or adjusted under 35 U.S.C. 154(b) by 3 days.

(21) Appl. No.: 14/582,526

(22) Filed: Dec. 24, 2014

(65) Prior Publication Data

US 2015/0182010 A1    Jul. 2, 2015

Related U.S. Application Data

(60) Provisional application No. 61/921,264, filed on Dec. 27, 2013.

(51) Int. Cl.
```
H05K 7/00      (2006.01)
F16M 13/02     (2006.01)
A45F 5/00      (2006.01)
F16M 13/00     (2006.01)
F16M 11/04     (2006.01)
F16M 13/04     (2006.01)
```
(52) U.S. Cl.
CPC .............. *A45F 5/00* (2013.01); *F16M 11/041* (2013.01); *F16M 13/00* (2013.01); *F16M 13/04* (2013.01); *A45F 2005/008* (2013.01); *A45F 2200/0525* (2013.01)

(58) Field of Classification Search
CPC ............. A45F 5/00; H05K 7/00; F16M 13/02
USPC ....................................................... 224/217
See application file for complete search history.

(56) References Cited

U.S. PATENT DOCUMENTS

| | | | |
|---|---|---|---|
| 2009/0020570 A1* | 1/2009 | Chan | A45F 5/00 224/222 |
| 2009/0219677 A1* | 9/2009 | Mori | A45F 3/14 361/679.03 |
| 2010/0171021 A1* | 7/2010 | Smith | A45C 13/30 248/558 |
| 2011/0034221 A1* | 2/2011 | Hung | A45C 11/00 455/575.8 |

(Continued)

OTHER PUBLICATIONS

International Search Report and Written Opinion mailed Mar. 24, 2015 regarding PCT/US2014/072342.

(Continued)

*Primary Examiner* — Brian D Nash
(74) *Attorney, Agent, or Firm* — Dykema Gossett PLLC

(57) ABSTRACT

A holder and mobile platform assembly may include a support plate shaped to fit in the palm of a user's hand. A hand strap may be attached to the support plate and configured to wrap around the user's hand. A mobile platform may be mounted for rotation on the support plate. The mobile platform may include a support surface having a releasable fastener provided thereon for supporting a first device, and a support compartment extending from an edge of the support surface for supporting a second device.

19 Claims, 7 Drawing Sheets

(56) References Cited

U.S. PATENT DOCUMENTS

| | | | |
|---|---|---|---|
| 2011/0267748 A1* | 11/2011 | Lane | A45F 5/00 361/679.01 |
| 2011/0278885 A1* | 11/2011 | Procter | B60R 11/0235 297/135 |
| 2011/0279959 A1 | 11/2011 | Lopez | |
| 2012/0025684 A1 | 2/2012 | Trotsky | |
| 2012/0043235 A1* | 2/2012 | Klement | A45C 11/00 206/320 |
| 2012/0048873 A1* | 3/2012 | Hyseni | A45F 5/00 220/752 |
| 2012/0224323 A1* | 9/2012 | Yang | F16M 11/041 361/679.55 |
| 2013/0092562 A1* | 4/2013 | Wyner | A45C 11/00 206/45.23 |
| 2013/0199948 A1 | 8/2013 | Lebauer | |

OTHER PUBLICATIONS

"LapWorks Handler iPad Strap & Desk Mount," LapWorks, Nov. 9, 2013 <http://laptopdesk.net/handler-ipad-strap-and-desk-mount.html>.

\* cited by examiner

UNIVERSAL HOLDER AND MOBILE PLATFORM FOR SUPPORTING A PLURALITY OF HAND-HELD DEVICES

CROSS-REFERENCE TO RELATED APPLICATIONS

This application claims the benefit of U.S. Provisional Application Ser. No. 61/921,264, filed Dec. 27, 2013, the disclosure of which is incorporated herein by reference in its entirety.

TECHNICAL FIELD

The present disclosure relates to a holder and mobile platform assembly, including a holder and mobile platform assembly that can be positioned in the palm of a user's hand and configured to support a plurality of mobile devices.

BACKGROUND

Various mobile and hand-held devices, such as tablet computers, electronic scanning devices, point-of-sale devices, cell phones, media players, and other objects may be held in one hand by a user. For example, a user may support the mobile device with one hand on the back of the device or by grasping the side of the device. The user may then interface with a touch screen on the mobile device or perform other functions with his or her other hand. However, holding such a device with one hand may be cumbersome and can present the problem that the device may be dropped and potentially damaged. Additionally, when the mobile device is held in one hand by grasping the side of the device, the user's hand may become fatigued. Also, the user may wish to rotate the mobile device without changing the position of his or her hand while holding the device.

There are also situations when a user may desire to support more than one mobile device at a time using only one hand. For example, a tablet computer may be used in conjunction with a credit card scanner or other point-of-sale device during a business transaction (e.g., at check-in or check-out). However, the use of multiple devices may tend to limit mobility of the user to a stationary desk or register, which can be inconvenient in certain situations.

Thus, it may be desirable to provide a holder and mobile platform assembly that can be conveniently positioned in the palm of a user's hand and configured to support a plurality of mobile devices with relative ease and comfort.

SUMMARY

In an embodiment of the present disclosure, a holder and mobile platform assembly may include a support plate shaped to fit in the palm of the user's hand. A hand strap may be attached to the support plate and configured to wrap around the user's hand. A mobile platform may be mounted for rotation on the support plate. The mobile platform may include a support surface having a releasable fastener provided thereon for supporting a first device, and a support compartment extending from an edge of the support surface for supporting a second device.

Various aspects of the present disclosure will become apparent to those skilled in the art from the following detailed description of the preferred embodiment, when read in light of the accompanying drawings.

DETAILED DESCRIPTION

Reference will now be made in detail to embodiments of the present disclosure, examples of which are described herein and illustrated in the accompanying drawings. While the invention will be described in conjunction with embodiments, it should be understood that they are not intended to limit the invention to these embodiments. On the contrary, the invention is intended to cover alternatives, modifications and equivalents, which may be included within the spirit and scope of the invention as defined by the appended claims.

Figure 1:
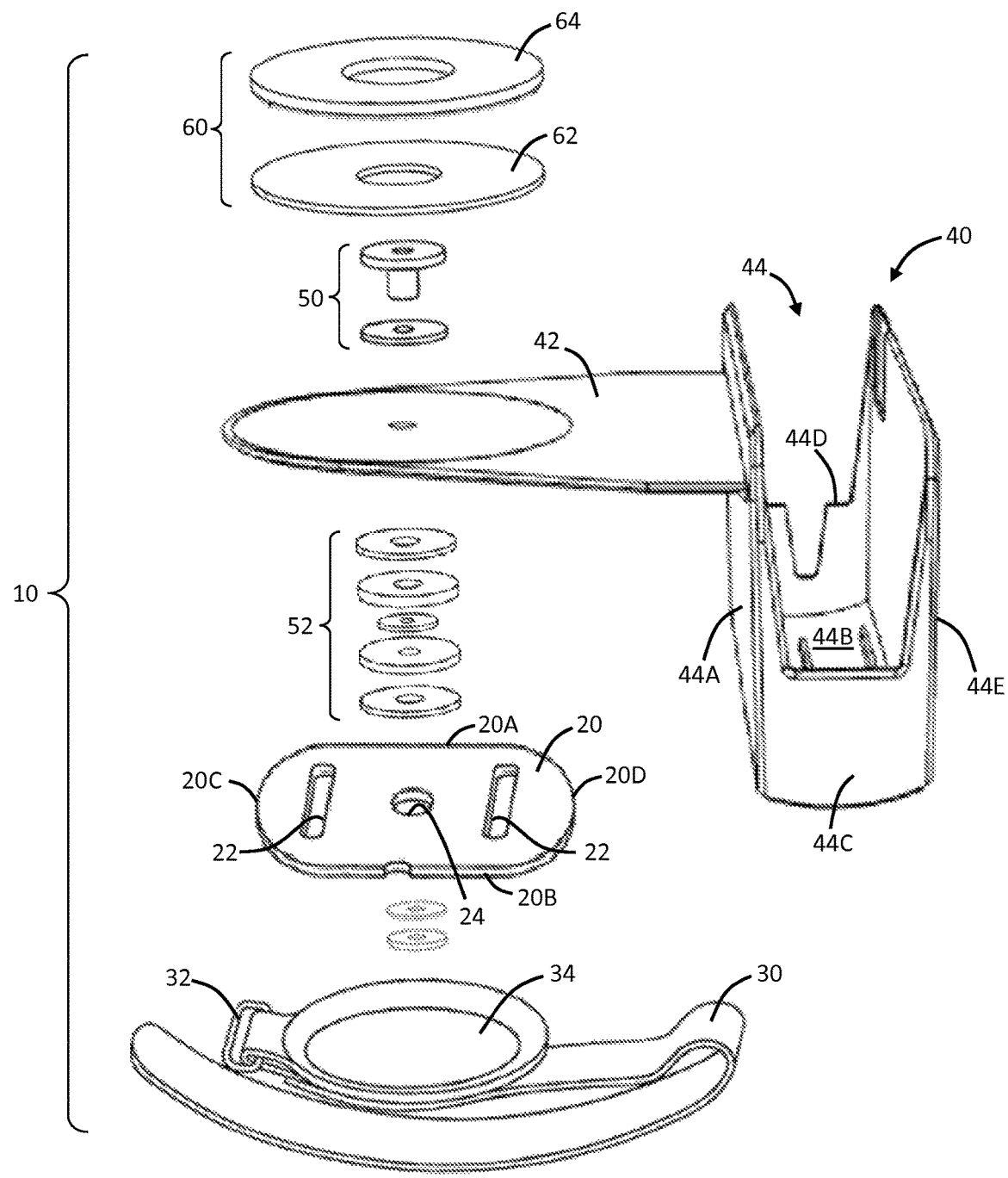
FIG. 1 is a perspective view of a holder and mobile platform assembly according to an embodiment of the present disclosure.
Figure 2:
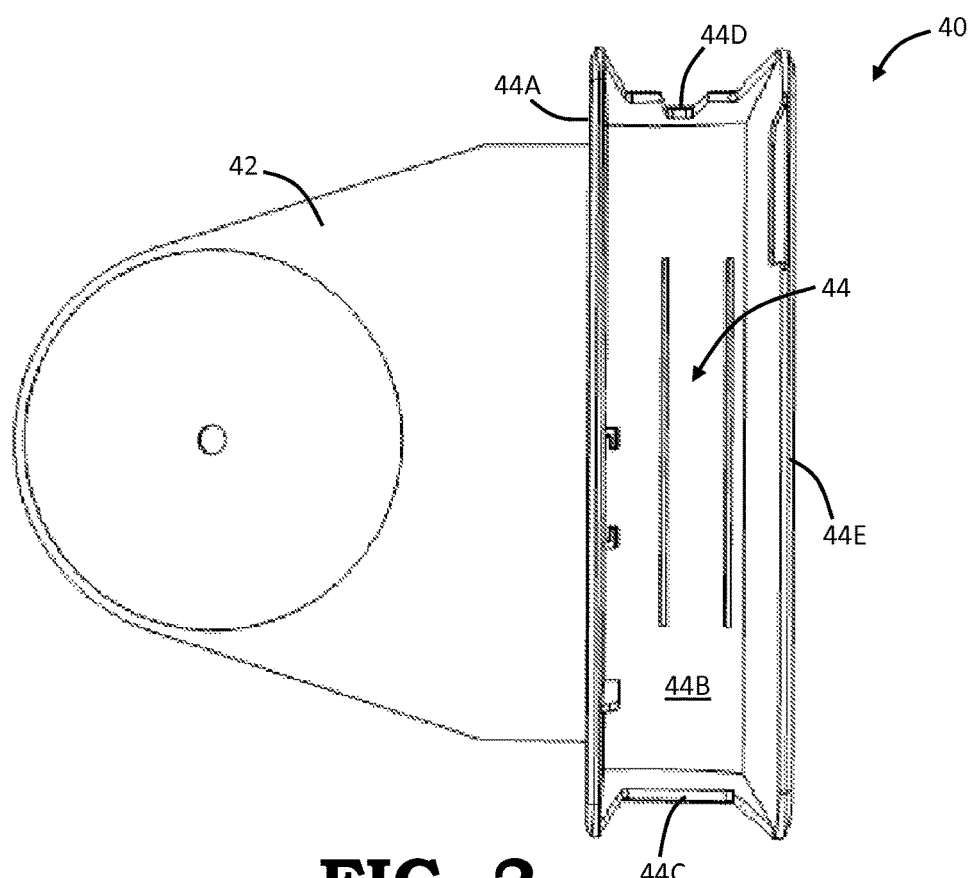
FIG. 2 is a top view of a mobile platform provided on the holder and mobile platform assembly generally shown in FIG. 1.

Referring now to FIG. 1, a holder and mobile platform assembly according to an embodiment of the present disclosure is generally illustrated at 10. The holder and mobile platform assembly 10 can be used to support a plurality of mobile or hand-held devices, such as electronic devices, in the palm of a user's hand. For example, in a non-limiting embodiment, the holder and mobile platform assembly 10 may be configured to support at least a tablet computer and a point-of-sale (POS) device, such as a credit card scanner. In other embodiments, however, the holder and mobile platform assembly 10 may be configured to support a variety of other mobile devices or objects without departing from the spirit and scope of the present disclosure. With this in mind, it should be appreciated that the holder and mobile platform assembly 10 can be used in other suitable environments and for other suitable purposes.

As generally shown in FIG. 1, an exploded view of the holder and mobile platform assembly 10 is provided. The holder and mobile platform assembly 10 may generally include a support plate 20, a hand strap 30, and a mobile platform 40. The hand strap 30 may be attached to the support plate 20 for securely positioning the holder and mobile platform assembly 10 in the palm of a user's hand. The mobile platform 40 may be mounted for rotation on the support plate 20 and can be configured to support a plurality of mobile devices in the palm of the user's hand. These and various other components of the holder and mobile platform assembly 10 will be generally described in further detail.

As generally shown, the support plate 20 may be a substantially flat member having a planar upper surface and a planar lower surface, respectively. However, in other non-limiting embodiments, the support plate 20 may have a non-planar or contoured lower surface that can be configured to generally fit in the palm of a user's hand. For example and without limitation, the lower surface may define a generally semi-spherical or semi-cylindrical surface that can generally correspond to the shape of a user's palm, although such is not required.

Further, the support plate 20 may have an outer peripheral shape that is also configured to fit in the palm of a user's hand. For example and without limitation, the support plate 20 may include a pair of substantially parallel edges 20A and 20B that extend along opposite sides of the support plate 20 and two outwardly curved or rounded edges 20C and 20D that are located at opposite ends of the support plate 20. Thus, when the support plate 20 is positioned in the palm of a user's hand, the substantially parallel edges 20A and 20B can be positioned between the thumb pad and the two middle fingers of the user's hand. The pointer finger and the pinky finger can wrap around the outwardly curved edges 20C and 20D, respectively, near one side 20A of the support plate 20, and the thumb can wrap around the outwardly curved edge 20C near the other side 20B of the support plate 20. In other embodiments, the support plate 20 may optionally include indentations or other features provided along the outer edges thereof to generally correspond with a user's fingers and/or thumb.

A pair of slots 22 and a thru-hole 24 may extend through the support plate 20 between the upper and lower surfaces, although such is not required. For example and without limitation, the slots 22 can be located near opposite ends 20C and 20D of the support plate 20 or at other suitable locations thereof. The thru-hole 24 can be generally located near a center of the support plate 20 or at another suitable location. At least one purpose of the slots 22 and the thru-hole 24 will be generally explained below.

Referring again to FIG. 1, the holder and mobile platform assembly 10 may also include a hand strap 30. The hand strap 30 may be configured to secure the holder and mobile platform assembly 10 in the palm of a user's hand. For example and without limitation, the hand strap 30 may be fed or looped through the slots 22 provided in the support plate 20 and can be configured to be wrapped around a backside of the user's hand.

In a non-limiting embodiment, a hoop member 32 can be provided near a first end of the hand strap 30. As such, a second end of the hand strap 30 can be wrapped around the backside of the user's hand, looped through the hoop member 32, and removably secured to an intermediate portion of the hand strap 30 using a hook-and-loop material (e.g., VELCRO™). In this manner, a length of the hand strap 30 can be easily adjustable to securely fit various sizes of hands. In other embodiments, the hand strap 30 may be secured around a user's hand using a buckle, a snap, or other type of suitable fastening member. It should also be appreciated that the hand strap 30 can be made of a suitable material including, for example and without limitation, fabric, rubber, polymers, neoprene, or the like and may be generally elastic, although such is not required.

The hand strap 30 may also include a pad 34, which can be configured to provide additional support and cushioning between the support plate 20 and a user's palm for improved comfort. For example and without limitation, the pad 34 can be attached to the hand strap 30 in a suitable manner, such as with stitching, fasteners, or an adhesive, and may be positioned between the support plate 20 and the user's palm. The pad 34 may be made from a generally soft material including, for example and without limitation, foam, cotton, rubber, neoprene, or the like. The pad 34 may also have a suitable shape and/or size to fit snugly in the palm of a user's hand. For example, the pad 34 can be generally round in shape and may be slightly smaller in size than the support plate 20, although such is not required.

Figure 3:
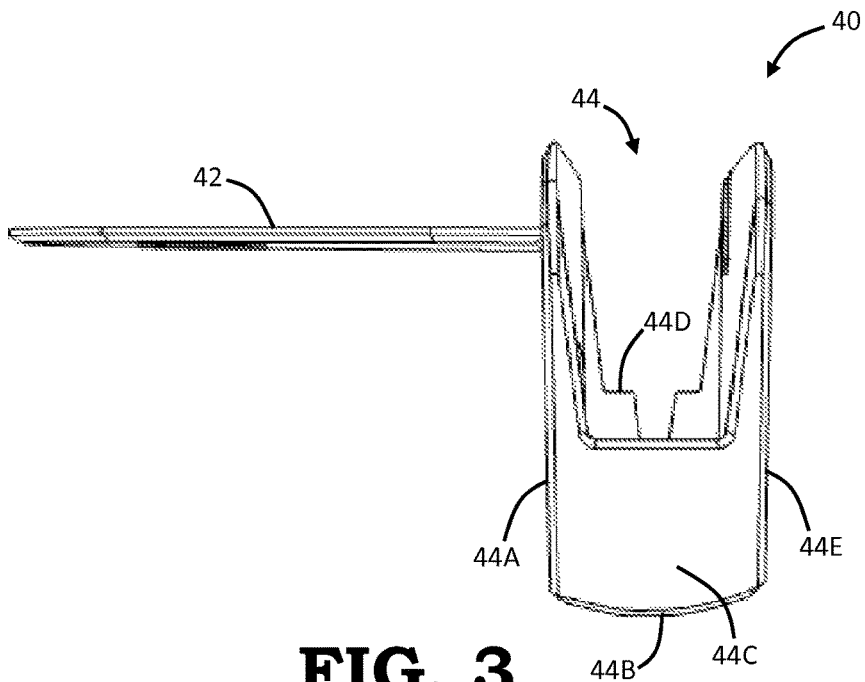
FIG. 3 is a side view of the mobile platform generally shown in FIG. 2.
Figure 4:
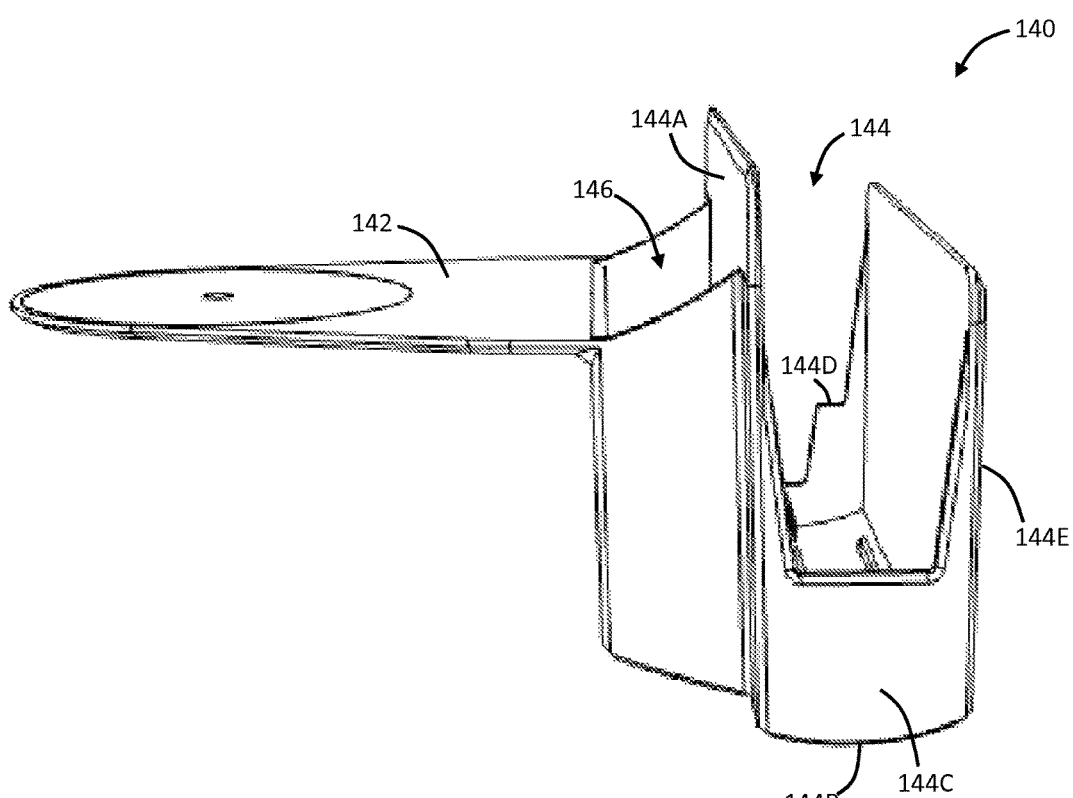
FIG. 4 is a perspective view of a mobile platform according to another embodiment of the present disclosure.

The holder and mobile platform assembly 10 may also include a mobile platform 40 that can be mounted for rotation on the support plate 20. Referring now to FIGS. 3 and 4, the mobile platform 40 may include a support surface 42, which can be configured to support a tablet computer or other type of mobile device. For example and without limitation, the support surface 42 may comprise a substantially flat or planar upper surface that faces outwardly when the holder and mobile platform assembly 10 is placed in a user's hand. In an embodiment, the support surface 42 may have a specific size and/or shape that can be customized to fit a specific device. In other embodiments, however, the support surface 42 may have a standard size and/or shape that may be suitable to support a variety of different mobile devices. In this regard, the holder and mobile platform assembly 10 may be universal. For example and without limitation, as generally shown in FIG. 3, the support surface 42 may have a generally triangular shape. In other embodiments, however, the support surface 42 may have a rectangular shape or other suitable shape.

The mobile platform 40 may also include a support compartment 44, which can be configured to support or otherwise hold at least a second mobile device or other object. In a non-limiting example, the support compartment 44 may be configured to hold a credit card scanner or other point-of-sale (POS) device. As generally shown in FIGS. 3 and 4, the support compartment 44 may define an open compartment that can extend from an edge of the support surface 42.

For example, in this embodiment, the support compartment 44 may include a back wall 44A, a bottom wall 44B, a pair of side walls 44C and 44D, and a front or outer wall 44E. The back wall 44A may extend downwardly from the support surface 42. In an embodiment, the back wall 44A may define a substantially right angle (i.e., 90 degree angle) or other suitable non-straight angle with the support surface 42. The bottom wall 44B may extend generally outwardly (i.e., away from the support surface 42) from a lower edge of the back wall 44A. In an embodiment, the bottom wall 44B may be generally parallel with the support surface 42. The side walls 44C and 44D may extend from opposite sides of the back wall 44A and along the bottom wall 44B. The front wall 44E may extend upwardly, respectively, from the bottom wall 44B and along the front edges of the side walls 44C and 44D.

In an embodiment, the support compartment 44 may have a specific size and/or shape that can be customized to fit a specific device. In other embodiments, however, the support compartment 44 may have a standard size and/or shape that may be suitable to support a variety of different mobile devices. In this regards, the holder and mobile platform assembly 10 may be universal.

As will be generally explained below in another embodiment, the support compartment 44 may also include a retaining member, although such is not required. The retaining member may be configured to resiliently secure a mobile device or other object within the support compartment 44. For example, the retaining member may comprise a cantilevered spring, a resilient tab, a lip, a fastener, or other suitable retaining feature.

The above-mentioned mobile device may be configured to perform a variety of functions including, for example and without limitation, scan credit cards, code electronic room keys, read barcodes, and scan smart cards, among other functions. Therefore, to provide full access to these and other functions of the device, the side walls 44C and 44D of the support compartment 44 may be relatively shorter in height than either or both the back wall 44A and the front wall 44E or may include a slot. This feature may enable a credit card or other type of card to be swiped through a card slot of the mobile device and may also provide access to USB ports, A/V jacks, charging ports, and other connections provided on the mobile device. Further, the front wall 44E may, for example and without limitation, include a window for viewing a screen or an access panel for accessing a key pad or touch screen on the mobile device. And although the support compartment 44 is described for use with a mobile device, it should be fully appreciated that the support compartment 44 can be configured to support a variety of other devices, including electronic and non-electronic devices.

As explained above, the mobile platform 40 may be mounted for rotation on the support plate 20. For example, as generally shown in FIG. 1, the holder and mobile platform assembly 10 may include a pivot assembly 50. In a non-limiting embodiment, the mobile platform 40 can be mounted adjacent to an upper surface of the support plate 20 using a rivet, a threaded fastener, or other type of suitable fastener, that may extend through the thru-hole 24. As such, the mobile platform 40 may be fully rotatable (i.e., 360 degree rotation) relative to the support plate 20 about an axis of the pivot assembly 50. It should be appreciated that the mobile platform 40 can be mounted or otherwise provided on the support plate 20 for rotation using other suitable fastening and/or pivot mechanisms.

As generally shown, the pivot assembly 50 may also include a plurality of washers 52 provided between the mobile platform 40 and the support plate 20, although such is not required. The washers 52 can be configured to reduce a magnitude of force that may otherwise be needed to rotate the mobile platform 40 relative to the support plate 20. For example, in a non-limiting embodiment, any or all of the washers 52 may be optionally coated with a lubricant to reduce rotational friction between the mobile platform 40 and the support plate 20. Other types of bearing members may be provided between the mobile platform 40 and the support plate 20.

The holder and mobile platform assembly 10 may also include a releasable fastener 60 for removably securing a mobile device, such as a tablet computer, to the upper or outwardly facing surface of the mobile platform 40. In an embodiment, as generally shown in FIG. 1, the releasable fastener 60 may include a first fastening member 62 that can be secured to the support surface 42 of the mobile platform 40 and a second fastening member 64 that can be secured to an opposing lower surface of the mobile device. For example and without limitation, the first and second fastening members 62 and 64 can be secured to the mobile platform 40 and the mobile device, respectively, using adhesives or other suitable fastening means.

In a non-limiting embodiment, the first and second fastening members 62 and 64 can be a releasable fastener material having interlocking projections. A non-limiting example of the releasable fastener material is sold by 3M under the trademark DUAL LOCK™. In other embodiments, the releasable fastener 60 can be other suitable releasable fasteners including, for example and without limitation, hook-and-loop material (i.e., VELCRO™), magnets, re-usable adhesives, or the like.

As such, when the first and second fastening members 62 and 64 are brought into contact with one another they become interlocked to form a connection. The first and second fastening members 62 and 64 may be disconnected after a separation force has been applied to at least one of the first and second fastening members 62 and 64. The amount of separation force required may be adjusted by configuring the size and/or shape of the first and second fastening members 62 and 64. In a non-limiting embodiment, for example, a separation force that is applied directly along the axis of rotation of the mobile platform 40 may be significantly higher than a separation force that is applied at an angle relative to the axis of rotation of the mobile platform 40. Thus, the releasable fastener 60 may allow the mobile device to remain securely attached to the mobile platform 40 with a high separation force, while also being configured to be removed with lower separation force if the user desires to remove the mobile device from the mobile platform 40.

Figure 5:
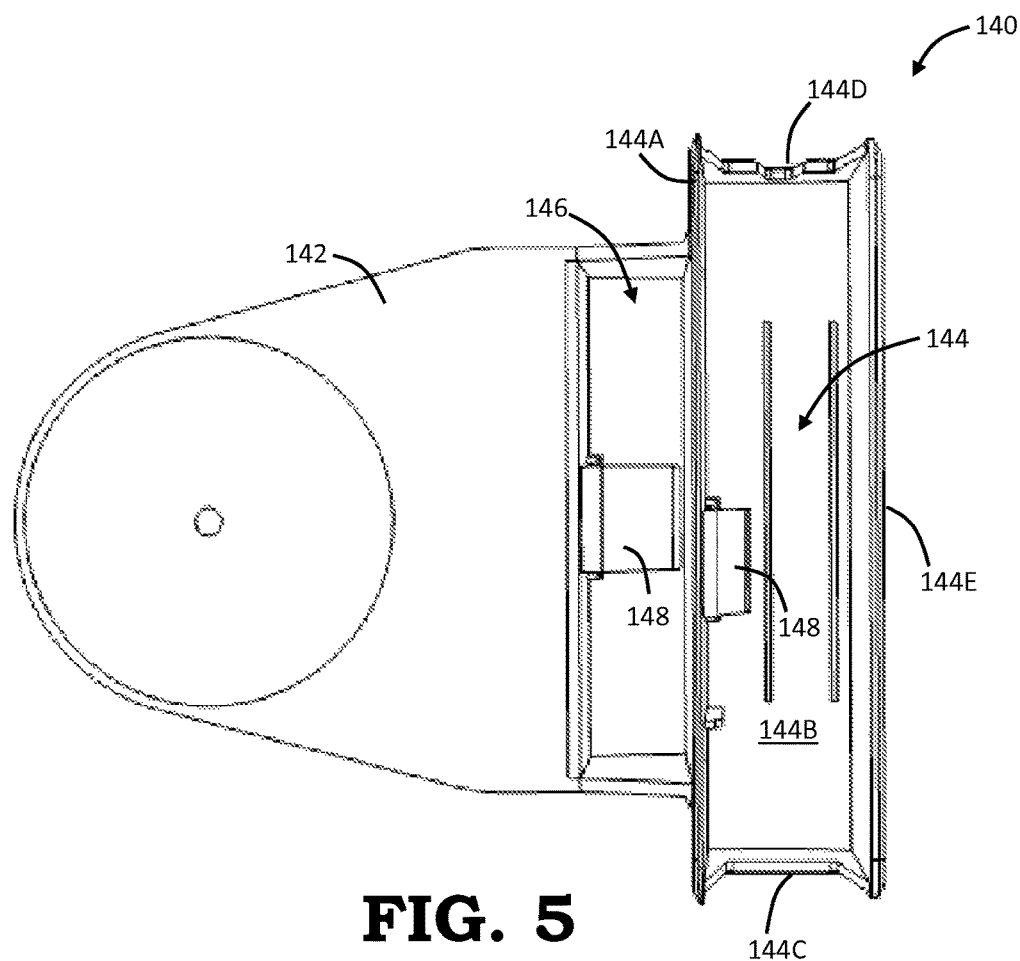
FIG. 5 is a top view of the mobile platform generally shown in FIG. 4.
Figure 6:
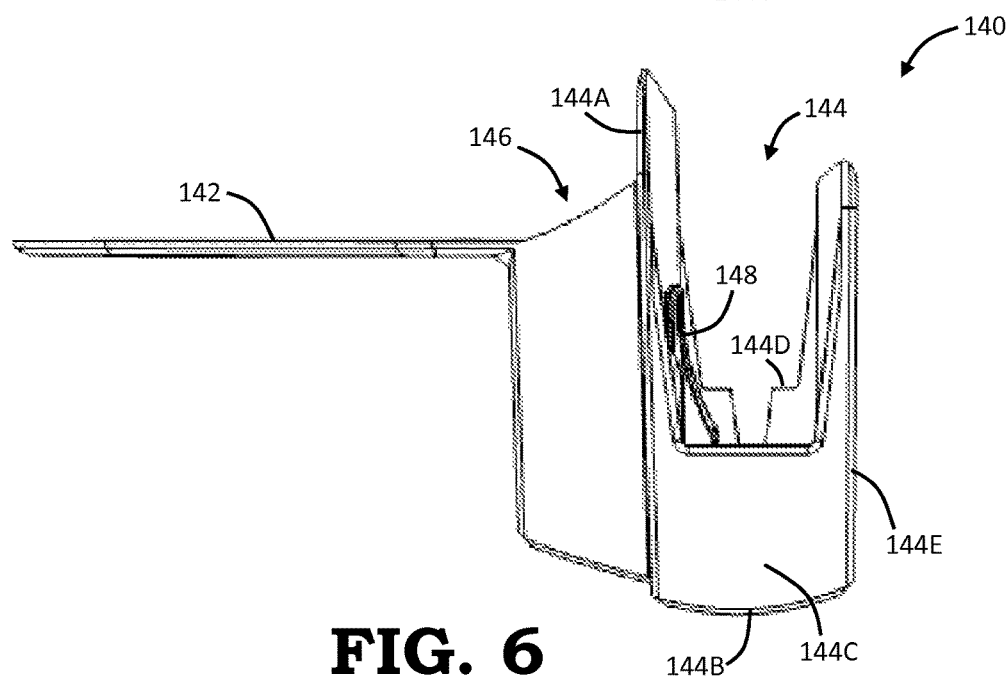
FIG. 6 is a side view of the mobile platform generally shown in FIG. 4.
Figure 7:
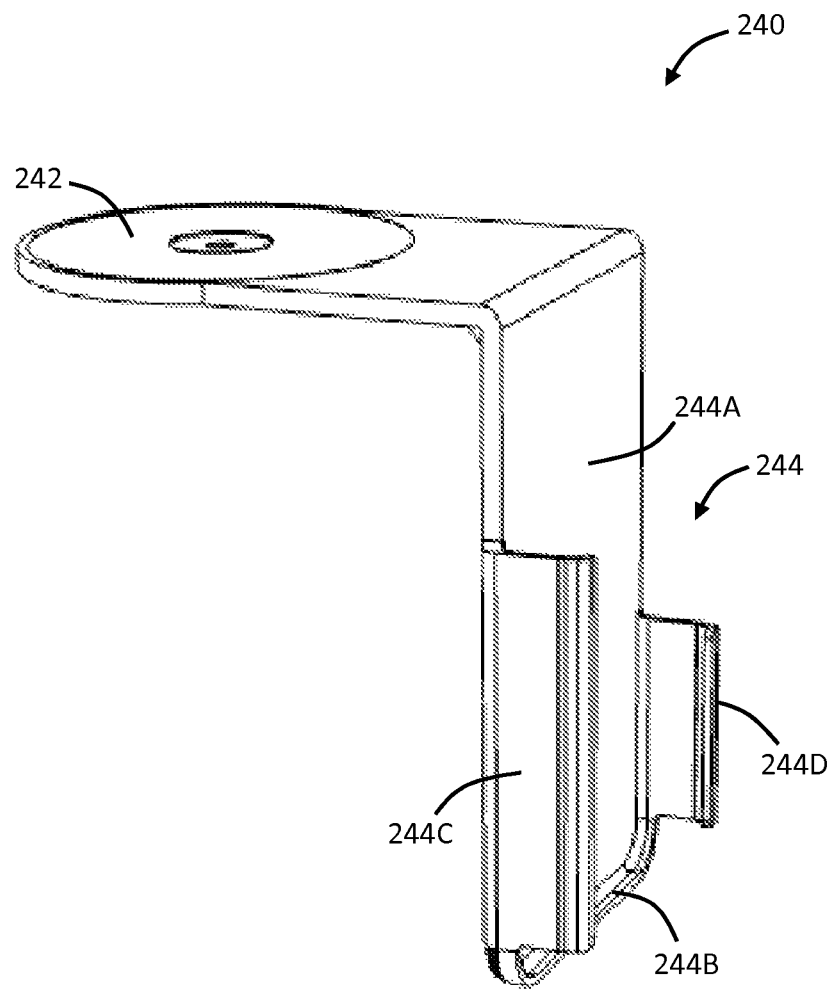
FIG. 7 is a perspective view of a mobile platform according to another embodiment of the present disclosure.
Figure 8:
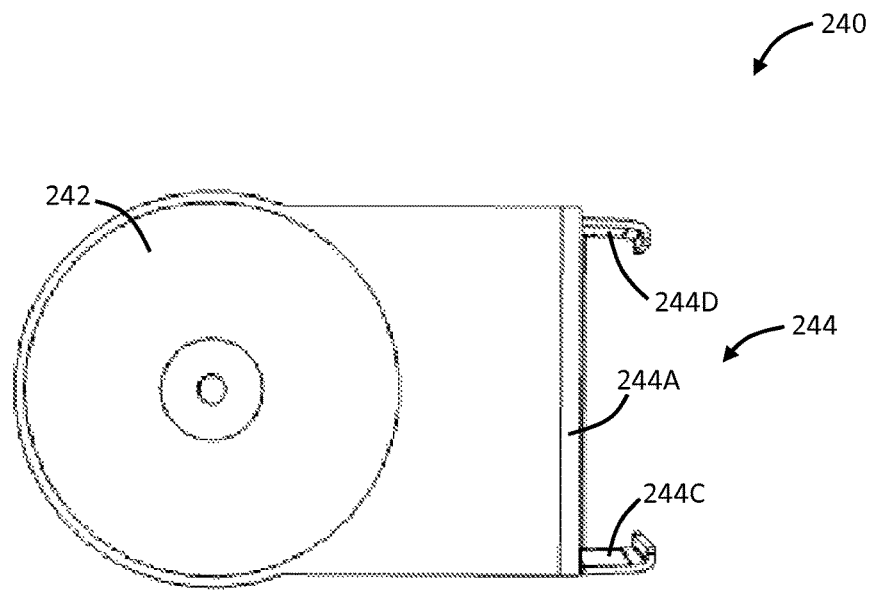
FIG. 8 is a top view of the mobile platform generally shown in FIG. 7.
Figure 9:
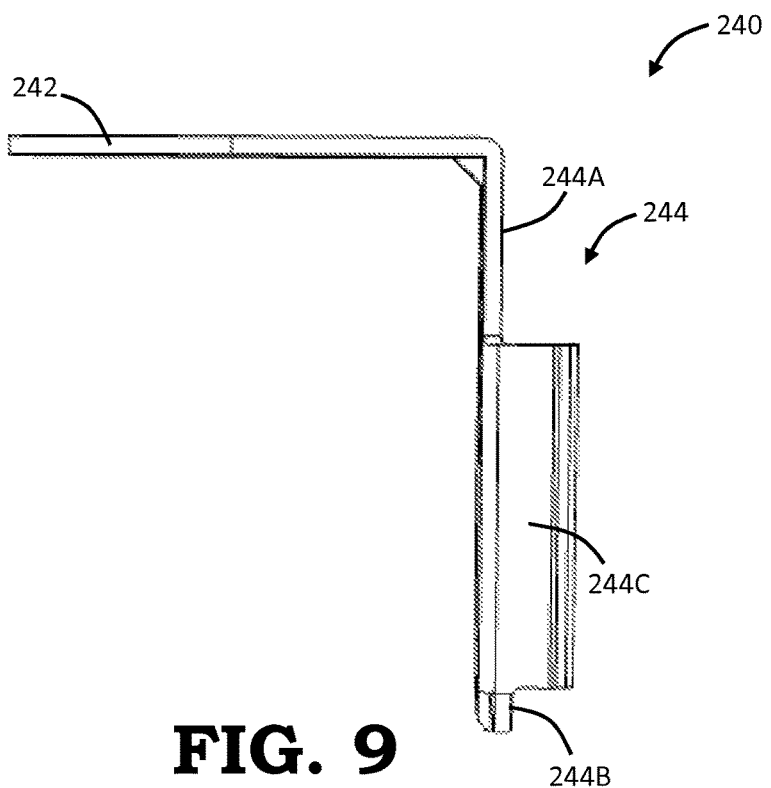
FIG. 9 is a side view of the mobile platform generally shown in FIG. 7.

Referring now to FIGS. 4-6, a mobile platform according to another embodiment of the present disclosure is generally shown at 140. The mobile platform 140 may include similar structural features as described and generally shown above in the previous embodiment, although such is not required. Similar features have been numbered with common reference numerals but have been increased by a value of 100 (e.g., 110, 120, 130, etc.). It should be appreciated that similar features can be structured similarly, operate similarly, and/or have the same function unless otherwise indicated by the drawings or this description.

For example, the mobile platform 140 in this embodiment may be configured to take the place of the mobile platform 40 of the holder and mobile platform assembly 10 in the previous embodiment.

As generally shown in FIGS. 4-6, the mobile platform 140 may include a support surface 142 and a support compartment 144. However, in this embodiment, the mobile platform 140 may also include a second support compartment 146, which can be configured to support or otherwise hold additional mobile devices or objects.

In a non-limiting embodiment, the second support compartment 146 may define an open compartment that can extend from an edge of the support surface 142. Thus, the second support compartment 146 may be located between the support surface 142 and the support compartment 144. In other embodiments, however, the support compartments 144 and 146 may be configured in other suitable arrangements without departing from the spirit and scope of the present disclosure. It should also be appreciated that the second support compartment 146 may include similar structural features as the first support compartment 44, although such is not required.

As generally shown in FIGS. 5 and 6, either or both of the support compartments 144 and 146 may optionally include a retaining member 148. The retaining member 148 may be configured to resiliently secure a mobile device or other object within the support compartments 144 and 146, although such is not required. For example, the retaining member 148 may comprise a cantilevered spring member that extends from an inner wall thereof. However, in other non-limiting embodiments, the retaining member 148 may comprise a resilient tab, a lip, a fastener, or other suitable retaining feature. It should also be appreciated that the retaining member 148 may be provided in the support compartment 44 of the mobile platform 40 in the previous embodiment.

Referring now to FIGS. 7-10, a mobile platform according to another embodiment of the present disclosure is generally shown at 240. The mobile platform 240 may include similar structural features as described and generally shown above in the previous embodiment, although such is not required. Similar features have been numbered with common reference numerals but have been increased by a value of 200 (e.g., 210, 220, 230, etc.). It should be appreciated that similar features can be structured similarly, operate similarly, and/or have the same function unless otherwise indicated by the drawings or this description.

For example, the mobile platform 240 in this embodiment may be configured to take the place of the mobile platform 40 of the holder and mobile platform assembly 10 in the previous embodiment.

As generally shown in FIGS. 7-10, the mobile platform 240 may include a support surface 242 and a support compartment 244. However, the support compartment 244 in this embodiment may comprise a generally open structure as opposed to a compartment-type structure that is generally described in the previous embodiments.

Figure 10:
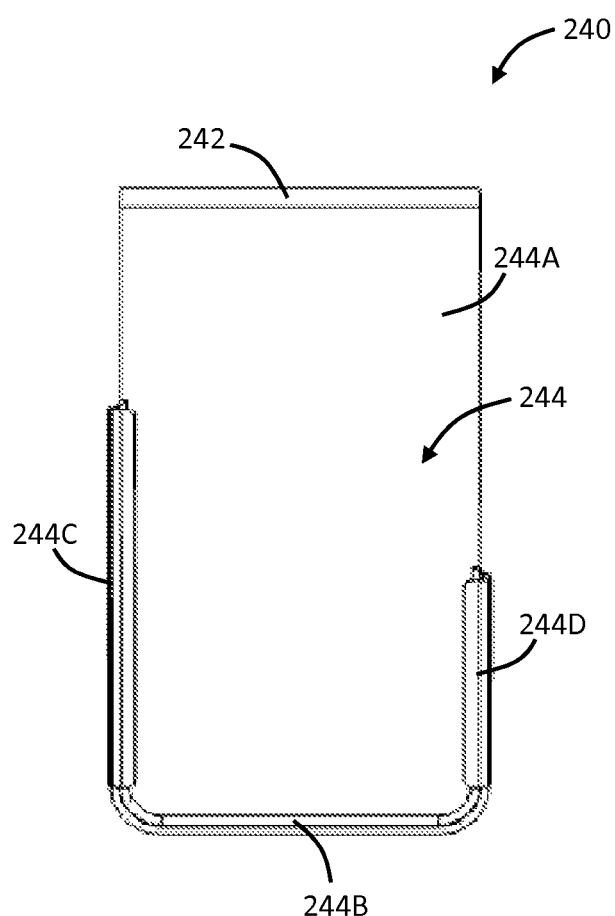
FIG. 10 is a front view of the mobile platform generally shown in FIG. 7.

For example and without limitation, the support compartment 244 may include a back wall 244A, a bottom lip 244B, and a pair of side brackets 244C and 244D. The back wall 244A may extend from the support surface 242. In an embodiment, the back wall 244A may define a substantially right angle (i.e., 90 degree angle) or other suitable non-straight angle relative to the support surface 242. The bottom lip 244B may extend generally outwardly (i.e., away from the support surface 242) from a lower edge of the back wall 244A. The side brackets 244C and 244D may extend from opposite sides of the back wall 244A. The side brackets 244C and 244D and the bottom lip 244B may be configured to removably secure a mobile device to the mobile platform 240. As generally shown in FIG. 10, the side brackets 244C and 244D may have different lengths to provide access to USB ports, A/V jacks, charging ports, and other connections provided on the mobile device. Moreover, it should also be appreciated that the support compartment 244 may be mounted for rotation relative to the support surface 242, although such is not required.

The principal and mode of operation of the present disclosure have been explained and illustrated in various embodiments. However, it must be understood that the concepts may be practiced other than as specifically explained and illustrated without departing from their spirit or scope.

What is claimed is:

1. A holder and mobile platform assembly for supporting a plurality of mobile devices in the palm of a user's hand, the holder and mobile platform assembly comprising:
   a support plate shaped to fit in the palm of said user's hand;
   a hand strap attached to the support plate and configured to wrap around said user's hand; and
   a mobile platform mounted for rotation on the support plate, wherein the mobile platform includes a support surface having a releasable fastener provided thereon for supporting a first device, and a support compartment extending from an edge of the support surface for supporting a second device, the support compartment comprising a back wall, two side brackets, and a bottom lip.

2. The holder and mobile platform assembly of claim 1, wherein the support plate comprises a pair of substantially parallel edges extending along opposite sides of the support plate and two outwardly curved or rounded edges located at opposite ends of the support plate.

3. The holder and mobile platform assembly of claim 1, wherein the support plate includes a pair of slots, and the hand strap is looped through the slots and configured to be wrapped around a backside of said user's hand.

4. The holder and mobile platform assembly of claim 3, wherein the hand strap includes a hoop member provided near a first end thereof, and a second end of the hand strap can be looped through the hoop member and removably secured to an intermediate portion of the hand strap using a hook-and-loop material.

5. The holder and mobile platform assembly of claim 1, wherein the hand strap includes a pad provided adjacent to a surface of the support plate.

6. The holder and mobile platform assembly of claim 1, wherein the mobile platform is mounted on the support plate by a pivot assembly for 360 degree rotation.

7. The holder and mobile platform assembly of claim 1, wherein the support compartment extends at a substantially right angle from the support surface.

8. The holder and mobile platform assembly of claim 1, wherein the support compartment comprises a back wall, a front wall, two side walls, and a bottom wall.

9. The holder and mobile platform assembly of claim 8, wherein at least one of the side walls is shorter in length than the back wall and the front to provide access to the support compartment.

10. The holder and mobile platform assembly of claim 1, wherein the mobile platform includes a first support compartment and a second support compartment.

11. The holder and mobile platform assembly of claim 1, wherein a retaining member is provided within the support compartment.

12. The holder and mobile platform assembly of claim 1, wherein the releasable fastener includes interlocking projections.

13. A holder and mobile platform assembly for supporting a plurality of mobile devices in the palm of a user's hand, the holder and mobile platform assembly comprising:
    a support plate shaped to fit in the palm of said user's hand;
    a hand strap attached to the support plate and configured to wrap around said user's hand; and
    a mobile platform mounted for rotation on the support plate, wherein the mobile platform includes a support surface having a releasable fastener provided thereon for supporting a first device, and a support compartment extending from an edge of the support surface for supporting a second device, wherein the mobile platform includes a first support compartment and a second support compartment.

14. A holder and mobile platform assembly for supporting a plurality of mobile devices in the palm of a user's hand, the holder and mobile platform assembly comprising:
    a support plate having a pair of substantially parallel edges extending along opposite sides of the support plate and two outwardly curved or rounded edges located at opposite ends of the support plate;
    a hand strap attached to the support plate and configured to wrap around said user's hand, wherein the hand strap includes a pad provided between the support plate and the palm of said user's hand; and
    a mobile platform mounted for rotation on the support plate, wherein the mobile platform includes a substantially flat support surface having a releasable fastener provided thereon for supporting a first device on the mobile platform, and a support compartment extending at a substantially right angle from an edge of the support surface for supporting a second device on the mobile platform, the support compartment comprising a back wall, two side brackets, and a bottom lip.

15. The holder and mobile platform assembly of claim 14, wherein the support plate includes a pair of slots, and the hand strap is looped through the slots and configured to be wrapped around a backside of said user's hand.

16. The holder and mobile platform assembly of claim 14, wherein the mobile platform is mounted on the support plate by a pivot assembly for 360 degree rotation.

17. The holder and mobile platform assembly of claim 14, wherein the support compartment comprises a back wall, a front wall, two side walls, and a bottom.

18. The holder and mobile platform assembly of claim 14, wherein the mobile platform includes a first support compartment and a second support compartment.

19. The holder and mobile platform assembly of claim 14, wherein a retaining member is provided within the support compartment.

\* \* \* \* \*